United States Patent
Chen

(10) Patent No.: US 9,794,826 B1
(45) Date of Patent: Oct. 17, 2017

(54) HANDLING OF TRAFFIC CONGESTION MESSAGES FOR WIRELESS COMMUNICATION DEVICES IN WIRELESS COMMUNICATION SYSTEMS

(71) Applicant: Sprint Communications Company L.P., Overland Park, KS (US)

(72) Inventor: Bonnie Chen, Grapevine, TX (US)

(73) Assignee: Sprint Communications Company, L.P., Overland Park, KS (US)

( * ) Notice: Subject to any disclaimer, the term of this patent is extended or adjusted under 35 U.S.C. 154(b) by 270 days.

(21) Appl. No.: 14/138,698

(22) Filed: Dec. 23, 2013

(51) Int. Cl.
*H04W 28/02* (2009.01)
*H04W 8/02* (2009.01)

(52) U.S. Cl.
CPC ......... *H04W 28/0289* (2013.01); *H04W 8/02* (2013.01)

(58) Field of Classification Search
None
See application file for complete search history.

(56) References Cited

U.S. PATENT DOCUMENTS

| 2011/0299395 | A1* | 12/2011 | Mariblanca Nieves | H04L 12/5695 370/235 |
| 2012/0170547 | A1* | 7/2012 | Oprescu-Surcobe | H04W 36/0072 370/331 |
| 2014/0355443 | A1* | 12/2014 | Smith | H04W 28/0289 370/235 |
| 2015/0003246 | A1* | 1/2015 | Chandramouli | H04W 28/0289 370/235 |

* cited by examiner

*Primary Examiner* — Rhonda Murphy

(57) ABSTRACT

Systems, methods, and software for handling traffic congestion messages in wireless communication systems are provided herein. In one example, method of operating a wireless communication system is provided. The method includes monitoring a traffic congestion message transferred by a radio access network of the wireless communication system for delivery to a congestion mitigation node responsive to user traffic congestion for a wireless communication device in the radio access network. The method includes identifying a destination network for the traffic congestion message. When the destination network indicates a congestion mitigation node not in the wireless communication system, the method includes withholding delivery of the traffic congestion message. When the destination network indicates a congestion mitigation node in the wireless communication system, the method includes allowing delivery of the traffic congestion message to the congestion mitigation node in the wireless communication system.

17 Claims, 5 Drawing Sheets

HANDLING OF TRAFFIC CONGESTION MESSAGES FOR WIRELESS COMMUNICATION DEVICES IN WIRELESS COMMUNICATION SYSTEMS

TECHNICAL FIELD

Aspects of the disclosure are related to the field of communications, and in particular, handling congestion messages for wireless communication devices in wireless communication systems.

TECHNICAL BACKGROUND

Wireless communication systems, such as cellular voice and data networks, typically include multiple wireless access nodes spread over a geographic area through which wireless communication devices can register and receive wireless access to communication services. In many examples, the wireless communication devices are mobile, and can move between wireless coverage areas of the wireless access nodes. More than one wireless communication system can be operated to provide wireless access to communication services, typically operated by different and competing service providers.

These various wireless communication systems can allow a wireless communication device which receives wireless service from a home wireless network operator to also receive service from non-home, or "roaming," wireless network operators via roaming agreements. When a device roams onto a wireless communication system of a first service provider, sometimes referred to as a visited wireless communication system, authentication and authorization for the roaming device is typically performed with the home service provider of the roaming device. However, during this authentication/authorization process as well as during normal operation, information about the wireless communication network of the first service provider can be inadvertently provided to the service provider of the roaming device, revealing potentially proprietary information to a competing wireless communication system service provider.

Overview

Systems, methods, and software for handling traffic congestion messages in wireless communication systems are provided herein. In one example, method of operating a wireless communication system is provided. The method includes monitoring a traffic congestion message transferred by a radio access network of the wireless communication system for delivery to a congestion mitigation node responsive to user traffic congestion for a wireless communication device in the radio access network. The method includes identifying a destination network for the traffic congestion message. When the destination network indicates a congestion mitigation node not in the wireless communication system, the method includes withholding delivery of the traffic congestion message. When the destination network indicates a congestion mitigation node in the wireless communication system, the method includes allowing delivery of the traffic congestion message to the congestion mitigation node in the wireless communication system.

In another example, a wireless communication system is provided. The wireless communication system includes a control node configured to monitor a traffic congestion message transferred by a radio access network of the wireless communication system for delivery to a congestion mitigation node responsive to user traffic congestion for a wireless communication device in the radio access network. The control node is configured to identify a destination network for the traffic congestion message. When the destination network indicates a congestion mitigation node not in the wireless communication system, the control node is configured to withhold delivery of the traffic congestion message. When the destination network indicates a congestion mitigation node in the wireless communication system, the control node is configured to allow delivery of the traffic congestion message to the congestion mitigation node in the wireless communication system.

In another example, a method of operating a control node of a wireless communication system is provided. The method includes monitoring traffic congestion messages transferred by a radio access network of the wireless communication system for delivery to congestion mitigation nodes responsive to user traffic congestion for wireless communication devices receiving wireless access in the radio access network. The method includes identifying if the traffic congestion messages are associated with wireless communication devices roaming onto the wireless communication system. When the traffic congestion messages are associated with wireless communication devices roaming onto the wireless communication system, the method includes inhibiting delivery of the associated traffic congestion messages to home wireless communication systems associated with the wireless communication devices. When the traffic congestion messages are associated with wireless communication devices homed by the wireless communication system, the method includes allowing delivery of the associated traffic congestion messages to congestion mitigation nodes of the wireless communication system.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
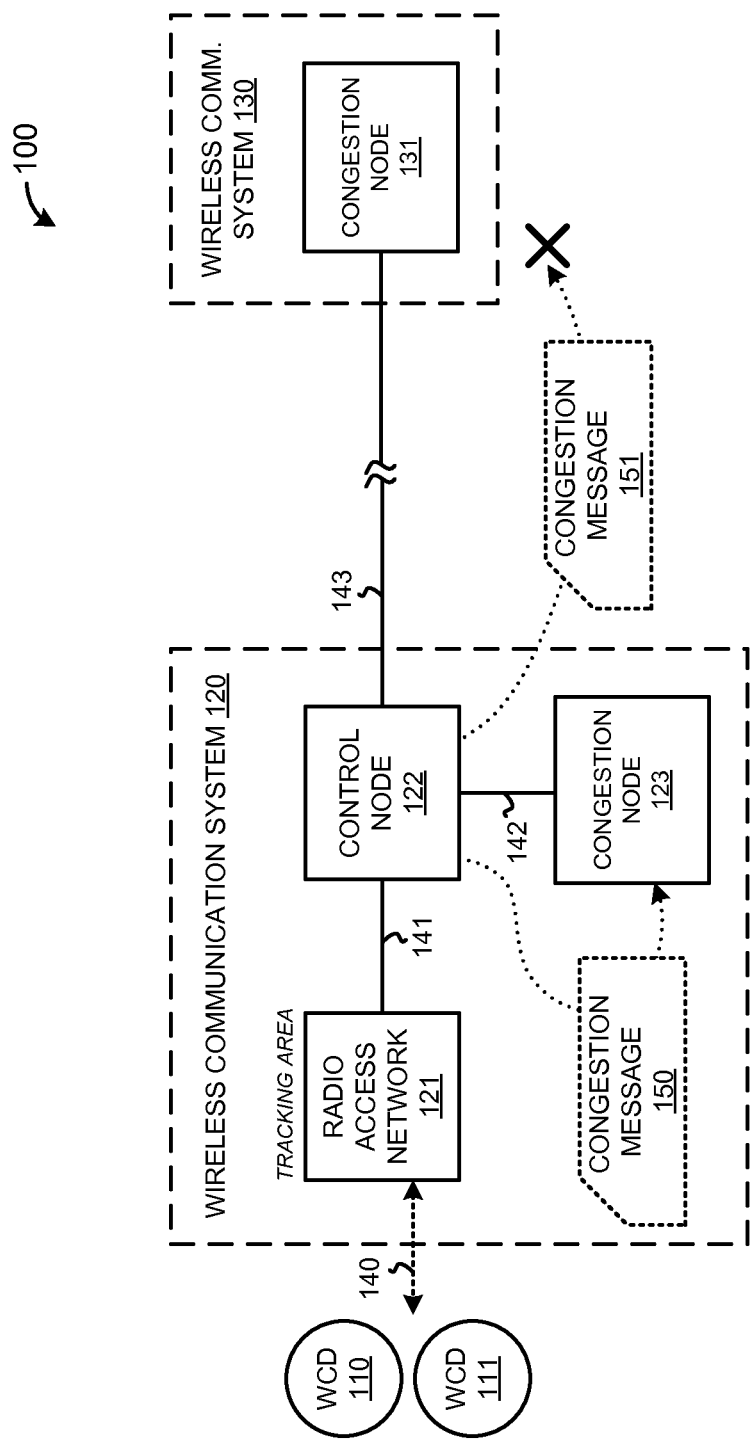
FIG. 1 is a system diagram illustrating a communication system.

FIG. 1 is a system diagram illustrating communication system 100. Communication system 100 includes wireless communication devices (WCD) 110-111, wireless communication system 120 and other wireless communication system 130. Wireless communication system 120 and other wireless communication system 130 communicate over link 143. Wireless communication system 120 is operated by a first service provider, and other wireless communication system 130 is operated by a second service provider. In some examples, the first service provider and the second service provider are competing wireless service providers, such as different wireless communication companies. In FIG. 1, wireless communication system 120 comprises a serving wireless communication system, which presently provides wireless access to wireless communication devices.

Wireless communication system 120 includes radio access network 121, control node 122, and congestion mitigation node 123. Radio access network 121 and control node 122 communicate over link 141. Control node 122 and congestion mitigation node 123 communicate over link 142. Radio access network 121 includes one or more wireless access nodes which can provide wireless access to communication services of wireless communication system 120. Control node 122 can provide network gateway and control services for user communications and overhead communications entering and leaving at least a portion of wireless communication system 120. Congestion mitigation node 123 can include one or more data structures that include policy information stored on a per-user or per-device basis. This policy information can control quality-of-service, level of service, location-based databases for comparing locations of wireless devices to network coverage.

Other wireless communication system 130 includes various wireless communication equipment, such as wireless access nodes, control nodes, routing nodes, and the like, but for this example only congestion mitigation node 131 is shown for clarity. Congestion mitigation node 131 can include one or more data structures that include policy information stored on a per-user or per-device basis. This policy information can control quality-of-service, level of service, location-based databases for comparing locations of wireless devices to network coverage.

In operation, WCD 110 receives home wireless communication service from other wireless communication system 130, and can receive roaming wireless communication service from wireless communication system 120. WCD 111 receives home wireless communication service from wireless communication system 120. During communication operations, such as when receiving wireless access to communication services over wireless link 140, radio access elements that support WCD 110 or WCD 111 might experience traffic congestion. This congestion can be detected by elements of radio access network 121.

Figure 2:
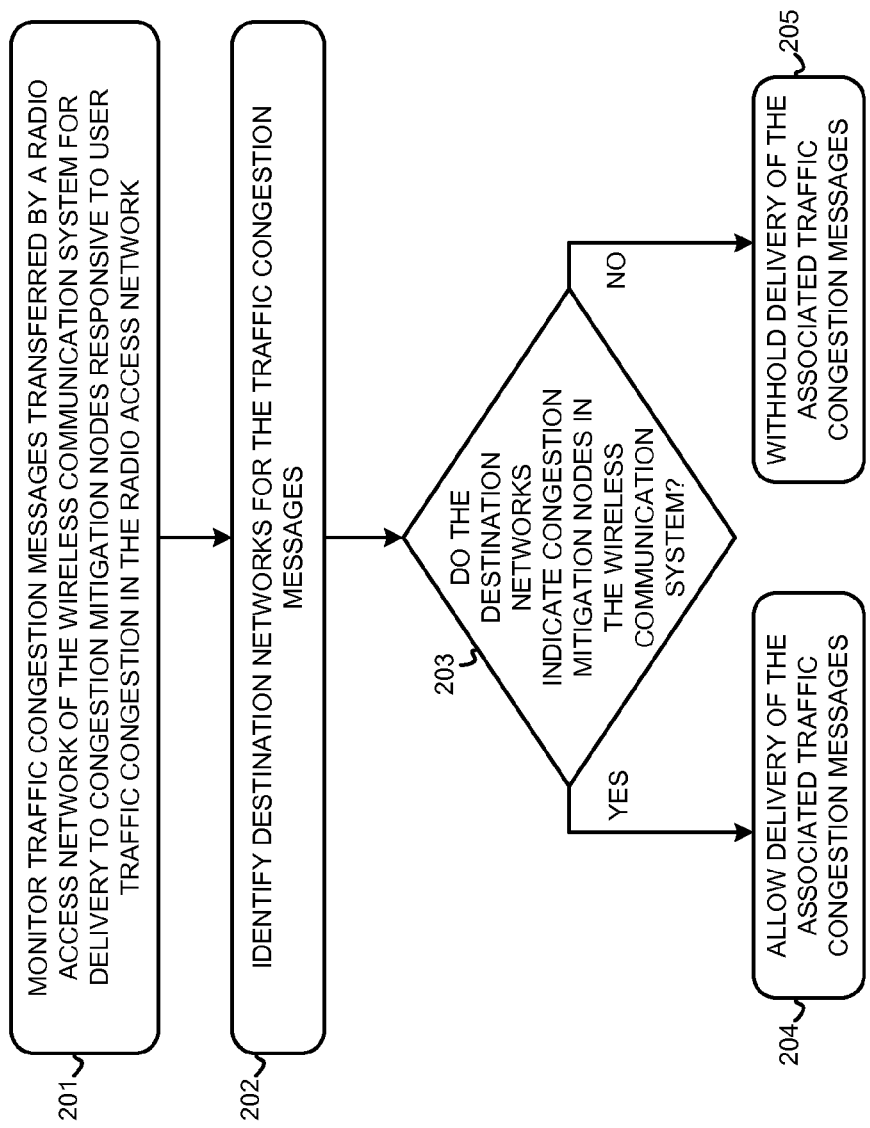
FIG. 2 is a flow diagram illustrating a method of operation of a control node of a communication system.

To further illustrate the operation of the elements of FIG. 1, FIG. 2 is presented. FIG. 2 is a flow diagram illustrating a method of operating control node 122 of communication system 100. The operations of FIG. 2 are referenced below parenthetically. In FIG. 2, control node 122 monitors (201) traffic congestion messages transferred by a radio access network 121 of wireless communication system 120 for delivery to congestion mitigation nodes responsive to user traffic congestion in radio access network. As discussed above, when receiving wireless access to communication services over wireless link 140, radio access elements of radio access network 121 that support WCD 110 or WCD 111 might experience traffic congestion. This congestion can be detected by elements of radio access network 121 and traffic congestion messages can be transferred to various nodes for notification and mitigation of the congestion.

For example, if elements of radio access network 121 experience congestion while serving home wireless services to WCD 111, then congestion message 150 can be transferred for delivery to a congestion mitigation node associated with WCD 111. Congestion mitigation node 123 is associated with wireless communication devices that are homed by wireless communication system 120 in this example, namely WCD 111. In another example, if elements of radio access network 121 experience congestion while serving roaming wireless services to WCD 110, then congestion message 151 can be transferred for delivery to a congestion mitigation node associated with WCD 110. Congestion mitigation node 131 is associated with WCD 110, and resides in another wireless communication system that provides home wireless services to WCD 110.

Control node 122 identifies (202) destination networks for the traffic congestion messages. In this example, control node 122 identifies a destination network for congestion message 150 as wireless communication system 120, and a destination network for congestion message 151 as wireless communication system 130. This destination network can be identified by determining a destination network address of the congestion message, by determining a home service provider of the associated wireless communication device, among other determinations.

When the destination networks indicate congestion mitigation nodes in wireless communication system 120 (203), control node 122 allows (204) delivery of the associated traffic congestion messages. Congestion message 150 is intended for delivery to congestion mitigation node 123 in wireless communication system 120, and control node allows delivery of congestion message 150 for delivery to congestion mitigation node 123.

When the destination networks indicate congestion mitigation nodes not in wireless communication system 120 (205), withhold delivery of the associated traffic congestion messages. Congestion message 151 is intended for delivery to congestion mitigation node 131 in wireless communication system 130, and control node 122 withholds delivery of congestion message 151 to congestion mitigation node 131. In some examples, in addition to withholding delivery of congestion message 151 to wireless communication system 130, control node 122 also transfers congestion message 151 to an alternate destination within wireless communication system 120, such as a dedicated congestion mitigation node for roaming wireless communication devices.

Figure 3:
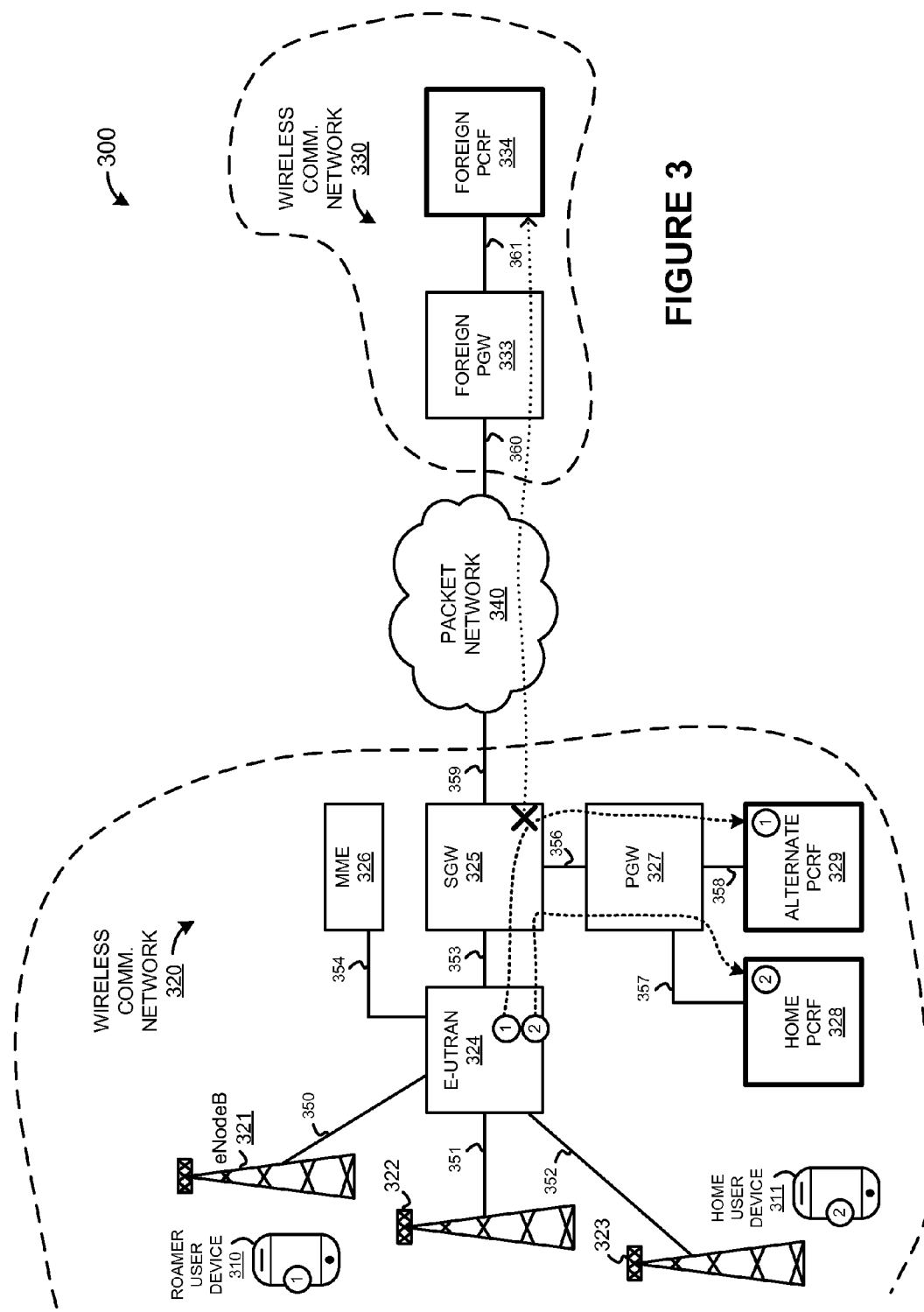
FIG. 3 is a system diagram illustrating a communication system.

As another example of a communication system, FIG. 3 is presented. FIG. 3 is a system diagram illustrating communication system 300. Communication system 300 includes roaming user device 310, home user device 311, wireless communication network 320, wireless communication network 330, and packet network 340. Wireless communication network 320 and wireless communication network 330 communicate through packet network 340 over at least Internet protocol (IP) links 359 and 360.

Wireless communication network 320 comprises a cellular voice and data network operated by a first service provider from which home user device 311 purchases wireless service. In FIG. 3, wireless communication network 320 comprises a serving wireless communication system, which presently provides wireless access to user devices 310-311. Wireless communication network 330 comprises a cellular voice and data network operated by a second service provider from which roaming user device 310 purchases wireless service. Thus, wireless communication network 330 is a 'foreign' wireless communication network from the perspective of wireless communication network 320. The term 'foreign' used herein merely indicates a wireless communication network operated by another or competing service provider.

Wireless communication network 320 includes Evolved UMTS Terrestrial Radio Access Node B (eNodeB) 321-323, E-UTRA Network (E-UTRAN) 324, serving gateway (SGW) 325, mobile management entity (MME) 326, packet data network gateway (PGW) 327, home Policy and Charging Rules Function node (PCRF) 328, and alternate PCRF 329, eNodeB 321 and E-UTRAN 324 communicate over backhaul link 350, eNodeB 322 and E-UTRAN 324 communicate over backhaul link 351, eNodeB 323 and E-UTRAN 324 communicate over backhaul link 352. E-UTRAN 324 and SGW 325 communicate over IP link 353. E-UTRAN 324 and MME 326 communicate over network link 354. SGW 325 and packet network 340 communicate over packet link 359. SGW 325 and PGW 327 communicate over IP link 356. PGW 327 and home PCRF 328 communicate over network link 357. PGW 327 and alternate PCRF 329 communicate over network link 358. Foreign wireless communication network 330 includes foreign PGW 333 and foreign PCRF 334. PGW 333 and PCRF 334 communicate over network link 361. PGW 333 and packet network 340 communicate over packet link 360.

eNodeB 321-323 each comprise base station equipment such as transceivers, antenna systems, traffic routing equipment, network interfaces, and the like. E-UTRAN 324 includes one or more eNodeB stations as well as further control and routing equipment that comprise a radio access network of wireless communication network 320. It should be noted that in some examples, eNodeB 321-323 comprise E-UTRAN 324, along with other eNodeB equipment. In other examples, eNodeB 321-323 comprise base station equipment and further aggregation and routing equipment is included in E-UTRAN 324, eNodeB 321-323 and E-UTRAN 324 each can include congestion detection equipment and software, which can detect congestion of resources used for providing wireless access to user devices.

SGW 325 includes gateway equipment for controlling the routing of communications associated with user device equipment regarding handovers, traffic congestion messaging, and other control messaging associated with providing wireless access to user devices. In this example SGW 325 includes equipment and software to detect congestion messages, inspect congestion messages to determine if the congestion messages are associated with home or roaming user devices, and route congestion messages based on at least whether the congestion messages are associated with roaming or home user devices.

MME 326 provides management and administration support to wireless network 320, such as handling paging distributing, idle mode devices, and other authentication and administration functions. PGW 327 and PGW 333 each handle routing and gateway functions for user communications between various networks, such as the Internet and other communication networks. Home PCRF 328 and foreign PCRF 334 each comprise policy nodes or congestion mitigation nodes of a wireless communication system. More than one PCRF node can be included in each wireless communication network of FIG. 3. In some examples, PCRF 328 or PCRF 329 can be included in the equipment of PGW 327, while PCRF 334 can be included in PGW 333. Packet network 340 comprises one or more packet networks, such as a metropolitan area network or the Internet. Packet network 340 can be an IP network.

Figure 4:
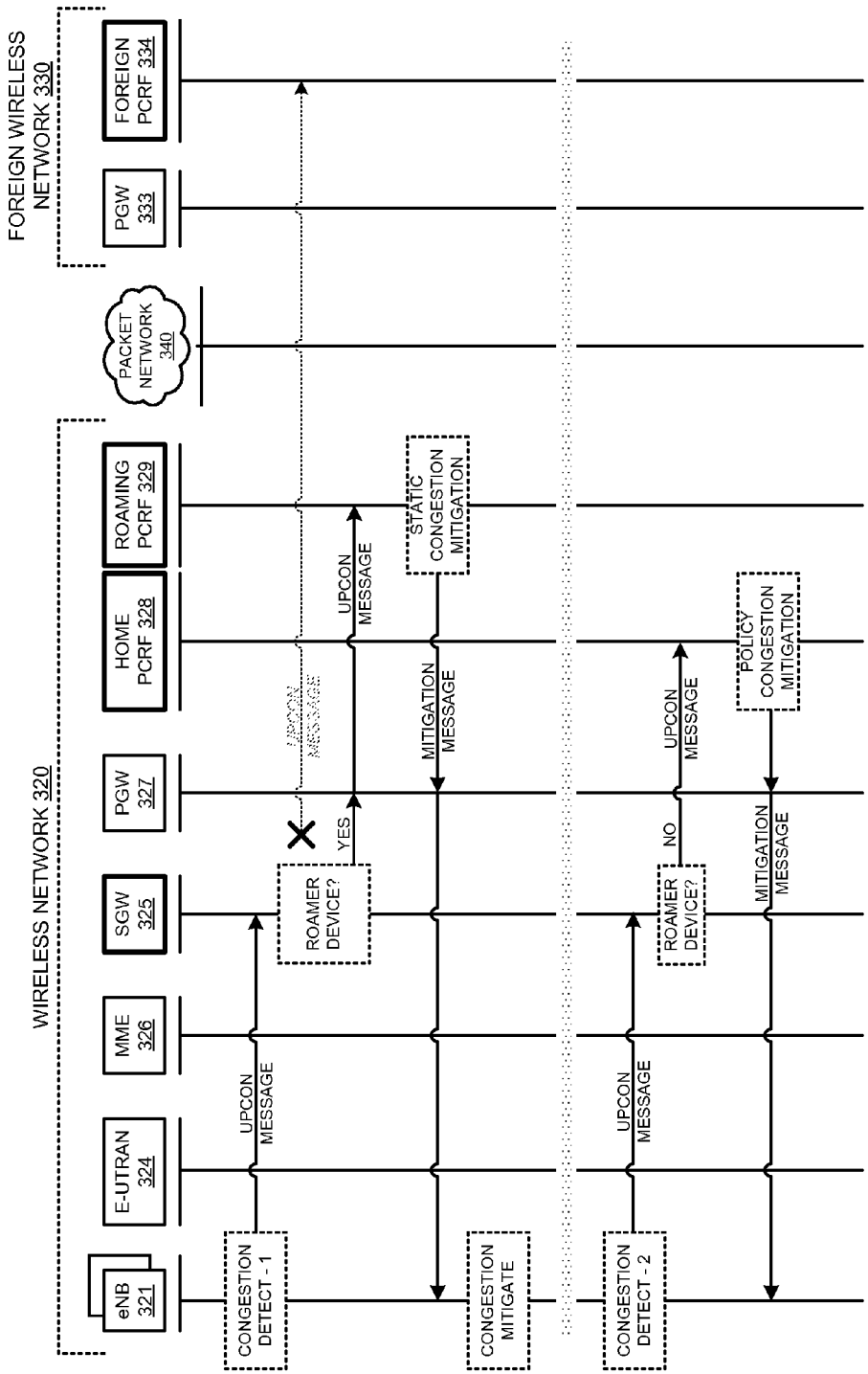
FIG. 4 is a sequence diagram illustrating a method of operation of a communication system.

To further illustrate the elements of FIG. 3, FIG. 4 is presented. FIG. 4 is a sequence diagram illustrating a method of operating wireless communication network 320 as well as operations of SGW 325. In FIG. 4, roamer user device 310 receives wireless access to communication services through eNodeB 321 and E-UTRAN 324. It should be noted that eNodeB 321 and E-UTRAN 324 can be included in the same equipment. User device 310 does not receive home wireless communication service through wireless communication network 320, and instead receives home wireless communication service through wireless communication network 330. Thus, user device 310 comprises a roaming device on wireless communication network 320.

During the course of the communication services, such as voice calls, text messaging, or data access, resources that serve user device 310 may become congested. The congestion can occur due to high volumes of traffic passing through similar communication elements as user device 310, such as when many user devices are also receiving wireless access through eNodeB 321 and elements of E-UTRAN 324. Responsive to this congestion, a congestion message can be transferred by eNodeB 321 or elements of E-UTRAN 324. This congestion message can indicate that congestion is occurring for user device 310. In some examples, this congestion message comprises a user plane congestion notification (UPCON) that indicates congestion on user communication portions of the communication resources service user device 310.

As shown in FIG. 4, the congestion is detected by eNodeB 321 (or alternatively, by elements of E-UTRAN 324) and the UPCON message is transferred for delivery to a congestion mitigation node associated with user device 310. In this example, this UPCON message is indicated by pathway '1' in FIG. 3. Since user device 310 is roaming onto wireless communication network 320, any associated UPCON messages are normally transferred for delivery to a congestion mitigation node associated with the home communication network of user device 310, namely a congestion mitigation node in wireless communication network 330. SGW 325 is the serving gateway for user device 310 and the UPCON message transits through SGW 325 en route to wireless communication network 330.

However, SGW 325 intercepts the UPCON message for user device 310 due to user device being a roaming communication device. Instead of transferring the UPCON message for delivery to wireless communication network 330, SGW 325 transfers the UPCON message for delivery to roaming PCRF 329 in wireless communication network 320. To determine that user device 310 is a roaming user device, SGW 325 can inspect the congestion message, such as the UPCON message, for indications that reveal user device 310 is a roaming user device. For example, the UPCON message might include a destination network address that indicates PGW 333, PCRF 334, or wireless communication network 330. The destination network address can comprise an IP address. In other examples, a roaming indicator is included in the UPCON message, where SGW 325 can identify the roaming status of user device 310 by identifying the roaming indicator. The roaming indication can be included in the UPCON message by the originating equipment that generates the UPCON message.

PCRF 329 is an example of a congestion mitigation node which handles congestion messages as well as handles quality of service, level of service, payment status, and other information associated with user devices. However, PCRF 329 is configured to handle at least congestion messages for devices that roam onto wireless communication network 320. These roaming congestion messages can be handled by assigning a special congestion response to roaming congestion messages. The special congestion response can be a static, fixed, or otherwise predetermined congestion response that handles all roaming devices in a similar manner. The special congestion response can also be dynamic and vary based on the contents or information included in the UPCON message. In this example, roaming PCRF 329 transfers a static congestion mitigation message for delivery to eNodeB 321 or E-UTRAN 324.

Responsive to the congestion mitigation message, eNodeB 321 or E-UTRAN 324 typically implement the static congestion message by reducing or restricting communication resource allocation for user device 310. This reduced or restricted communication resource allocation can include user-plane resources, such as resources dedicated to user communications. The resources can include wireless resources, such as resource blocks, RF power, timeslot allocation, frequency band allocation, or other resources associated with a wireless link. The resources can include routing, gateway, or network resources used for handling user traffic that propagates through E-UTRAN 324 or other elements of wireless communication network 320.

Roaming devices, such as user device 310, do not receive home communication service with wireless communication network 320 and instead receive home communication service with wireless communication network 330. Thus, wireless communication network 320, as described herein, does not desire to transfer UPCON or other congestion messages to 'foreign' wireless communication networks, since sensitive network operational statuses or confidential internal network operating information might be transferred to a competitor wireless communication network that indicates congestion or identifies operating conditions of eNodeB elements.

In another example, such as during non-roaming situations, congestion messages are handled by at least home PCRF 328, and custom or individualized congestion responses can be performed based on various factors including level of service purchased for the user devices, individualized quality of service considerations, among other factors. A second example for a home user device is shown, as indicated by pathway '2' in FIG. 3.

In this second example, FIG. 4 shows home user device 311 receiving wireless access to communication services through eNodeB 323 and E-UTRAN 324. User device 311 receives home wireless communication service through wireless communication network 320. Thus, user device 311 comprises a home device on wireless communication network 320.

During the course of the communication services, such as voice calls, text messaging, or data access, resources that serve user device 311 may become congested. The congestion can occur due to high volumes of traffic passing through similar communication elements as user device 311, such as when many user devices are also receiving wireless access through eNodeB 323 and elements of E-UTRAN 324. It should be noted that eNodeB 323 and E-UTRAN 324 can be included in the same equipment. Responsive to this congestion, a congestion message can be transferred by eNodeB 323 or elements of E-UTRAN 324. This congestion message can indicate that congestion is occurring for user device 311. In some examples, this congestion message comprises a user plane congestion notification (UPCON) that indicates congestion on user communication portions of the communication resources service user device 311.

As shown in FIG. 4, the congestion is detected by eNodeB 323 (or alternatively, by elements of E-UTRAN 324) and the UPCON message is transferred for delivery to a congestion mitigation node associated with user device 311. In this example, this UPCON message is indicated by pathway '2' in FIG. 3. Since user device 311 is homed onto wireless communication network 320, any associated UPCON messages are transferred for delivery to a congestion mitigation node associated with the home communication network of user device 311, namely PCRF 328 in wireless communication network 320. SGW 325 is the serving gateway for user device 311 and the UPCON message transits through SGW 325 en route to the congestion mitigation node. However, SGW 325 does not intercept the UPCON message for user device 311 due to user device being a home communication device. SGW 325 transfers the UPCON message for delivery to home PCRF 328 in wireless communication network 320.

PCRF 328 is an example of a congestion mitigation node, which handles congestion messages as well as handles quality of service, level of service, payment status, and other information associated with user devices. PCRF 328 is configured to handle at least congestion messages for devices that are homed on wireless communication network 320. These roaming congestion messages can be handled by custom or individualized congestion responses can be performed based on various factors including level of service purchased for the user device, individualized quality of service considerations, among other factors. Home PCRF 328 transfers a custom congestion mitigation message for delivery to eNodeB 323 or elements of E-UTRAN 324 in this example. Responsive to the congestion mitigation message, eNodeB 323 or E-UTRAN 324 typically implement the congestion message by reducing or restricting communication resource allocation for user device 311, such as discussed above for user device 310. However, if user device 311 receives premium service from wireless communication network 320, then a reduction or restriction on communication resources might not occur for user device 311.

It should be noted that the term "congestion mitigation node" is used herein to refer to equipment and systems that determine policy and mitigation actions for user devices. In the examples shown in FIGS. 3 and 4, the congestion mitigation nodes are PCRF nodes, which handle policy and other individualized user device service level determinations. Many PCRF nodes can be included in wireless communication network 320 to handle many user devices that receive home wireless communication service from wireless communication network 320.

However, instead of transferring congestion messages for roaming wireless communications to a wireless communication network that the roaming devices are homed on, SGW 325 can transfer these congestion messages to a designated or congestion mitigation node included in wireless communication network 320. This prevents congestion messages from being transferred to 'other' or 'foreign' competitor wireless communication networks. In some examples, the congestion messages associated with roaming user devices are not transferred to a special congestion mitigation node in wireless communication network 320, and instead are merely 'dropped' or ignored by SGW 325.

Figure 5:
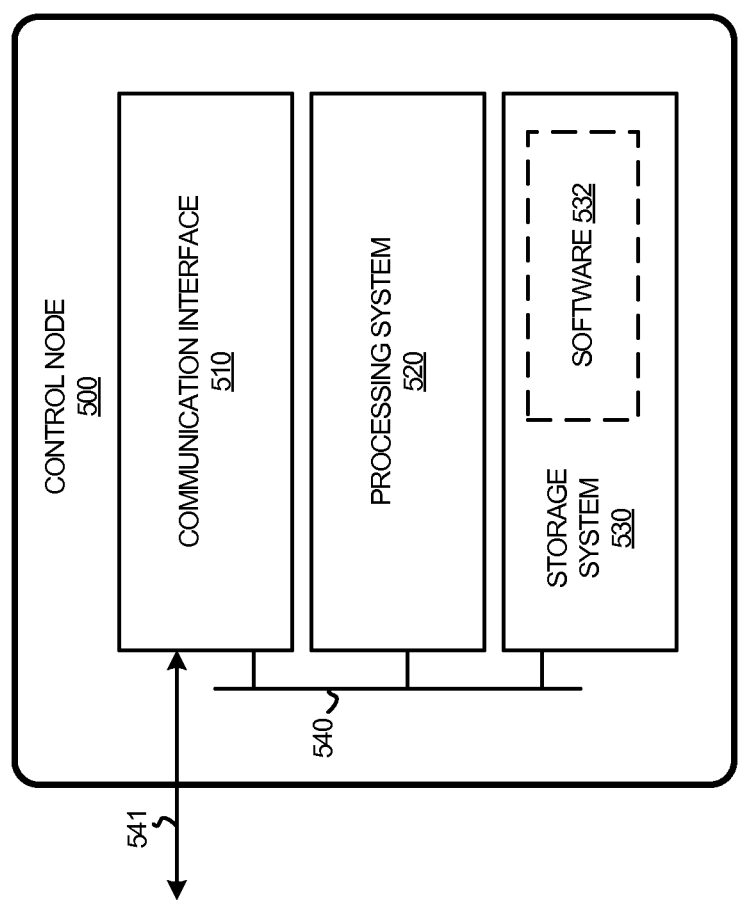
FIG. 5 is a block diagram illustrating a control node.

FIG. 5 is a block diagram illustrating a detailed view of control node 500. Control node 500 can include equipment and systems as discussed herein for control node 122 in FIG. 1 and SGW 325 in FIG. 3, although variations are possible. Control node 500 includes communication interface 510, processing system 520, and storage system 530. In operation, processing system 520 is operatively linked to communication interface 510 and storage system 530 by bus 540. It should be understood that discrete links can be employed, such as network links or other circuitry. Control node 500 can be distributed or consolidated among equipment or circuitry that together forms the elements of control node 500. Control node 500 can optionally include additional devices, features, or functionality not discussed here for purposes of brevity.

Communication interface 510 includes one or more network interfaces for communicating over communication networks, such as wireless communication system 120 of FIG. 1. The network interfaces can include an Ethernet interface, or other local or wide area network communication interfaces which can communicate over a communication link. Examples of communication interface 510 include network interface card equipment, transceivers, modems, and other communication circuitry. In this example, communication interface 510 communicates over link 541. Link 541 can include any communication link as described herein, such as that described for links 141-142 in FIG. 1.

Processing system 520 can comprise one or more microprocessors and other circuitry that retrieves and executes software 532 from storage system 530. Processing system 520 can be implemented within a single processing device but can also be distributed across multiple processing devices or sub-systems that cooperate in executing program instructions. Examples of processing system 520 include general purpose central processing units, application specific processors, and logic devices, as well as any other type of processing device, combinations, or variations thereof.

Storage system 530 can comprise any computer readable storage media readable by processing system 520 and capable of storing software 532. Storage system 530 can include volatile and nonvolatile, removable and non-removable media implemented in any method or technology for storage of information, such as computer readable instructions, data structures, program modules, or other data. In addition to storage media, in some implementations storage system 530 can also include communication media over which software 532 can be communicated. Storage system 530 can be implemented as a single storage device but can also be implemented across multiple storage devices or sub-systems co-located or distributed relative to each other. Storage system 530 can comprise additional elements, such as a controller, capable of communicating with processing system 520. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 532 can be implemented in program instructions and among other functions can, when executed by control node 500 in general or processing system 520 in particular, direct control node 500 or processing system 520 to monitor a traffic congestion message transferred by a radio access network of a wireless communication system for delivery to a congestion mitigation node responsive to user traffic congestion for a wireless communication device in the radio access network, identify a destination network for the traffic congestion message, when the destination network indicates a congestion mitigation node not in the wireless communication system, withhold delivery of the traffic congestion message, and when the destination network indicates a congestion mitigation node in the wireless communication system, allow delivery of the traffic congestion message to the congestion mitigation node in the wireless communication system, among other operations. Software 532 can include additional processes, programs, or components, such as operating system software, database software, or application software. Software 532 can also comprise firmware or some other form of machine-readable processing instructions executable by processing system 520.

In at least one implementation, the program instructions can include first program instructions that direct processing system 520 to monitor a traffic congestion message transferred by a radio access network of a wireless communication system for delivery to a congestion mitigation node responsive to user traffic congestion for a wireless communication device in the radio access network, identify a destination network for the traffic congestion message, when the destination network indicates a congestion mitigation node not in the wireless communication system, withhold delivery of the traffic congestion message, and when the destination network indicates a congestion mitigation node in the wireless communication system, allow delivery of the traffic congestion message to the congestion mitigation node in the wireless communication system, among other operations.

In general, software 532 can, when loaded into processing system 520 and executed, transform processing system 520 overall from a general-purpose computing system into a special-purpose computing system customized to monitor a traffic congestion message transferred by a radio access network of a wireless communication system for delivery to a congestion mitigation node responsive to user traffic congestion for a wireless communication device in the radio access network, identify a destination network for the traffic congestion message, when the destination network indicates a congestion mitigation node not in the wireless communication system, withhold delivery of the traffic congestion message, and when the destination network indicates a congestion mitigation node in the wireless communication system, allow delivery of the traffic congestion message to the congestion mitigation node in the wireless communication system, among other operations. Encoding software 532 on storage system 530 can transform the physical structure of storage system 530. The specific transformation of the physical structure can depend on various factors in different implementations of this description. Examples of such factors can include, but are not limited to the technology used to implement the storage media of storage system 530 and whether the computer-storage media are characterized as primary or secondary storage. For example, if the computer-storage media are implemented as semiconductor-based memory, software 532 can transform the physical state of the semiconductor memory when the program is encoded therein. For example, software 532 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Control node 500 can also include other elements, such as user interfaces, computer systems, databases, distributed storage and processing elements, and the like. Control node 500 can be included in the equipment or systems of wireless communication system 120 of FIG. 1, or can be included in separate equipment or systems, including combinations thereof.

Referring back to FIG. 1, wireless communication devices 110-111 each comprise one or more antennas, transceiver circuitry elements, and communication elements. The transceiver circuitry typically includes amplifiers, filters, modulators, and signal processing circuitry. Wireless communication devices 110-111 can also each include user interface systems, memory devices, non-transitory computer-readable storage mediums, software, processing circuitry, or some other communication components. Wireless communication devices 110-111 can each be a user device, subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof.

Wireless communication system 120 and other wireless communication system 130 each comprise communication and control systems for providing access to communication services for user devices and networks. Wireless communication system 120 and other wireless communication system 130 can each provide communication services including communication routing, link bridging, network communications, data exchange, or other communication services. In some examples, wireless communication system 120 and other wireless communication system 130 are each a cellular voice and data network that can provide voice calls, text messages, data access, or other communication services provided over cellular or wireless communication networks. In some examples, wireless communication system 120 and other wireless communication system 130 each include equipment to provide wireless access to communication services within different coverage areas to user devices, route communications between content providers and user devices, and facilitate handoffs between equipment of different coverage areas, among other operations. Wireless communication system 120 and other wireless communication system 130 can also each comprise elements such as radio access network (RAN) equipment, E-UTRAN Node B equipment, eNodeB equipment, Evolved Node B equipment, Mobility Management Entity (MME) equipment, interworking functions (IWF), Home Subscriber Servers (HSS), Policy and Charging Rules Function nodes (PCRF), packet data network gateways (PGW), serving gateways (SGW), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, or other communication and control equipment.

Radio access network 121 is associated with wireless communication system 120, and provides wireless link 140 for wireless access to the communication services of wireless communication system 120 within one or more geographic areas associated with wireless access nodes. Radio access network 121 comprises wireless access nodes which include RF communication and control circuitry, transceivers, and antennas, as well as wireless communications equipment capable of communicating with and providing wireless access within a wireless coverage area to communication services for wireless communication devices, such as wireless communication device 110. The RF communication circuitry typically includes amplifiers, filters, RF modulators, transceivers, and signal processing circuitry. Radio access network 121 can also comprise elements such as base stations, base transceiver stations (BTS), E-UTRAN Node B equipment, eNodeB equipment, Evolved Node B equipment, Evolved Universal Terrestrial Radio Access (E-UTRA) network equipment.

Control node 122 comprises routing, gateway, and network interfacing equipment. Control node 122 handles the transfer of network traffic for user devices, such as WCD 110-111, between other networks or systems. In some examples, control node 122 can include computer processing systems and equipment, communication or network interfaces, as well as computer systems, microprocessors, circuitry, cloud-based systems, or some other processing devices or software systems, and can be distributed among multiple processing devices. Examples of Control node 122 can also include software such as an operating system, logs, databases, utilities, drivers, networking software, and other software stored on a computer-readable medium Congestion mitigation node 123 and congestion mitigation node 131 each comprise computer processing systems and equipment. Congestion mitigation node 123 and congestion mitigation node 131 can each include communication or network interfaces, as well as computer systems, microprocessors, circuitry, cloud-based systems, or some other processing devices or software systems, and can be distributed among multiple processing devices. Examples of congestion mitigation node 123 and congestion mitigation node 131 can each also include software such as an operating system, logs, databases, utilities, drivers, networking software, and other software stored on a computer-readable medium.

Communication links 141-143 each use metal, glass, optical, air, space, or some other material as the transport media. Communication links 141-143 can each use various communication protocols, such as Time Division Multiplex (TDM), asynchronous transfer mode (ATM), Internet Protocol (IP), Ethernet, synchronous optical networking (SONET), hybrid fiber-coax (HFC), Universal Serial Bus (USB), circuit-switched, communication signaling, wireless communications, or some other communication format, including combinations, improvements, or variations thereof. Communication links 141-143 can each be a direct link or can include intermediate networks, systems, or devices, and can include a logical network link transported over multiple physical links. Communication links 141-143 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Communication link 140 includes one or more wireless links, and use the air or space as the transport media. Communication link 140 comprises one or more wireless communication links provided over an associated wireless frequency spectrum or wireless frequency band, and can use various protocols. In this example, communication link 140 can each comprise Long Term Evolution (LTE), LTE Advanced, Code Division Multiple Access (CDMA), Evolution-Data Optimized (EVDO), single-carrier radio transmission technology link (1xRTT), Global System for Mobile Communication (GSM), Universal Mobile Telecommunications System (UMTS), High Speed Packet Access (HSPA), Radio Link Protocol (RLP), 3rd Generation Partnership Project (3GPP) Worldwide Interoperability for Microwave Access (WiMAX), Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), IEEE 802.11, Wireless Fidelity (Wi-Fi), or some other cellular or wireless communication format, including combinations, improvements, or variations thereof.

Although one main link for each of links 140-143 is shown in FIG. 1, it should be understood that links 140-143 are merely illustrative to show communication modes or access pathways. In other examples, further links can be shown, with portions of the further wireless links shared and used for different communication sessions or different content types, among other configurations.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a serving wireless communication system presently providing wireless access to communication services for at least a wireless communication device, the method comprising:
   in a control node of the serving wireless communication system, monitoring a traffic congestion message transferred by a radio access network of the serving wireless communication system for delivery to a congestion mitigation node responsive to user traffic congestion for the wireless communication device in the radio access network;
   in the control node, identifying a destination network for the traffic congestion message;
   when the destination network indicates a congestion mitigation node in a roaming wireless communication system, withholding delivery of the traffic congestion message to the congestion mitigation node in the roaming wireless communication system and transferring a custom traffic congestion message for delivery to a roamer congestion mitigation node in the roaming wireless communication system configured to handle wireless communication devices that are roaming onto the serving wireless communication system;
   when the destination network indicates a congestion mitigation node in the serving wireless communication system, allowing delivery of the traffic congestion message to the congestion mitigation node in the serving wireless communication system.

2. The method of claim 1, wherein allowing delivery of the traffic congestion message comprises transferring the traffic congestion message for delivery to a Policy and Charging Rules Function (PCRF) in the serving wireless communication system that is indicated by the traffic congestion message.

3. The method of claim 1, wherein withholding delivery of the traffic congestion message comprises withholding delivery of the traffic congestion message from delivery to a Policy and Charging Rules Function (PCRF) in the roaming wireless communication system that is indicated by the traffic congestion message.

4. The method of claim 1, wherein the control node comprises a serving gateway (SGW) of a Long Term Evolution (LTE) wireless network comprising the serving wireless communication system, and wherein allowing delivery of the traffic congestion message comprises transferring the traffic congestion message for delivery to a Policy and Charging Rules Functions (PCRF) of the LTE network that is indicated by the traffic congestion message.

5. The method of claim 1, wherein if the wireless communication device associated with the traffic congestion message is a wireless communication device roaming onto the serving wireless communication system, then identifying the destination network as indicating the congestion mitigation node in the roaming wireless communication system; and
   if the wireless communication device associated with the traffic congestion message is a wireless communication device homed by the serving wireless communication system, then identifying the destination network as indicating the congestion mitigation node in the serving wireless communication system.

6. The method of claim 1, wherein identifying the destination network for the traffic congestion message comprises determining a destination address for the traffic congestion message and identifying the destination address as being associated with the destination network.

7. The method of claim 1, wherein identifying the destination network for the traffic congestion message comprises identifying if a roaming indication is included in the traffic congestion message, and wherein the destination network indicates the congestion mitigation node is in the roaming wireless communication system if the roaming indication is included in the traffic congestion message.

8. The method of claim 1, wherein the traffic congestion message comprises a User Plane Congestion Notification (UPCON) message, and wherein identifying the destination network for the traffic congestion message comprises determining a destination address for the UPCON message.

9. A wireless communication system, comprising:
   a control node of the wireless communication system configured to monitor a traffic congestion message transferred by a radio access network of the wireless communication system for delivery to a congestion mitigation node responsive to user traffic congestion for a wireless communication device in the radio access network;
   the control node configured to identify a destination network for the traffic congestion message;
   when the destination network indicates a congestion mitigation node in a roaming wireless communication system, the control node is configured to withhold delivery of the traffic congestion message to the congestion mitigation node in the roaming wireless communication system and transfer a custom traffic congestion message for delivery to a roamer congestion mitigation node in the roaming wireless communication system configured to handle wireless communication devices that are roaming onto the serving wireless communication system;
   when the destination network indicates a congestion mitigation node in the wireless communication system, the control node is configured to allow delivery of the traffic congestion message to the congestion mitigation node in the wireless communication system.

10. The wireless communication system of claim 9, comprising:
    when the destination network indicates a congestion mitigation node in the wireless communication system, the control node is configured to transfer the traffic congestion message for delivery to a Policy and Charging Rules Function (PCRF) in the wireless communication system that is indicated by the traffic congestion message.

11. The wireless communication system of claim 9, comprising:
when the destination network indicates the congestion mitigation node in the roaming wireless communication system, the control node is configured to withhold delivery of the traffic congestion message from delivery to a Policy and Charging Rules Function (PCRF) not in the wireless communication system that is indicated by the traffic congestion message.

12. The wireless communication system of claim 9, wherein the control node comprises a serving gateway (SGW) of a Long Term Evolution (LTE) wireless network comprising the wireless communication system, and comprising:
when the destination network indicates the congestion mitigation node in the wireless communication system, the control node is configured to allow delivery of the traffic congestion message to a Policy and Charging Rules Functions (PCRF) of the LTE network that is indicated by the traffic congestion message.

13. The wireless communication system of claim 9, comprising:
if the wireless communication device associated with the traffic congestion message is a wireless communication device roaming onto the wireless communication system, then the control node is configured to identify the destination network as indicating the congestion mitigation node in the roaming wireless communication system; and
if the wireless communication device associated with the traffic congestion message is a wireless communication device homed by the wireless communication system, then the control node is configured to identify the destination network as indicating the congestion mitigation node in the roaming wireless communication system.

14. The wireless communication system of claim 9, comprising:
the control node configured to determine a destination address for the traffic congestion message and identify the destination address as being associated with the destination network.

15. The wireless communication system of claim 9, comprising:
the control node configured to identify if a roaming indication is included in the traffic congestion message, and determine the destination network indicates the congestion mitigation node is in the roaming wireless communication system if the roaming indication is included in the traffic congestion message.

16. The wireless communication system of claim 9, wherein the traffic congestion message comprises a User Plane Congestion Notification (UPCON) message, and comprising:
the control node configured to determine a destination address for the UPCON message to identify the destination network for the traffic congestion message.

17. A method of operating a control node of a serving wireless communication system presently providing wireless access to communication services for wireless communication devices, the method comprising:
monitoring traffic congestion messages transferred by a radio access network of the serving wireless communication system for delivery to congestion mitigation nodes responsive to user traffic congestion for the wireless communication devices receiving the wireless access in the radio access network;
identifying if the traffic congestion messages are associated with roaming ones of the wireless communication devices roaming onto the serving wireless communication system;
when the traffic congestion messages are associated with the roaming ones of the wireless communication devices roaming onto the serving wireless communication system, inhibiting delivery of the associated traffic congestion messages to home wireless communication systems associated with the roaming ones of the wireless communication devices and redirecting the associated traffic congestion messages to at least one predetermined congestion mitigation node in the serving wireless communication system configured to handle the traffic congestion messages that are associated with the roaming ones of the wireless communication devices;
when the traffic congestion messages are associated with home ones of the wireless communication devices homed by the serving wireless communication system, allowing delivery of the associated traffic congestion messages to congestion mitigation nodes of the serving wireless communication system.

* * * * *